Feb. 12, 1952      K. PARKER      2,585,675
DRAIN VALVE
Filed May 18, 1950
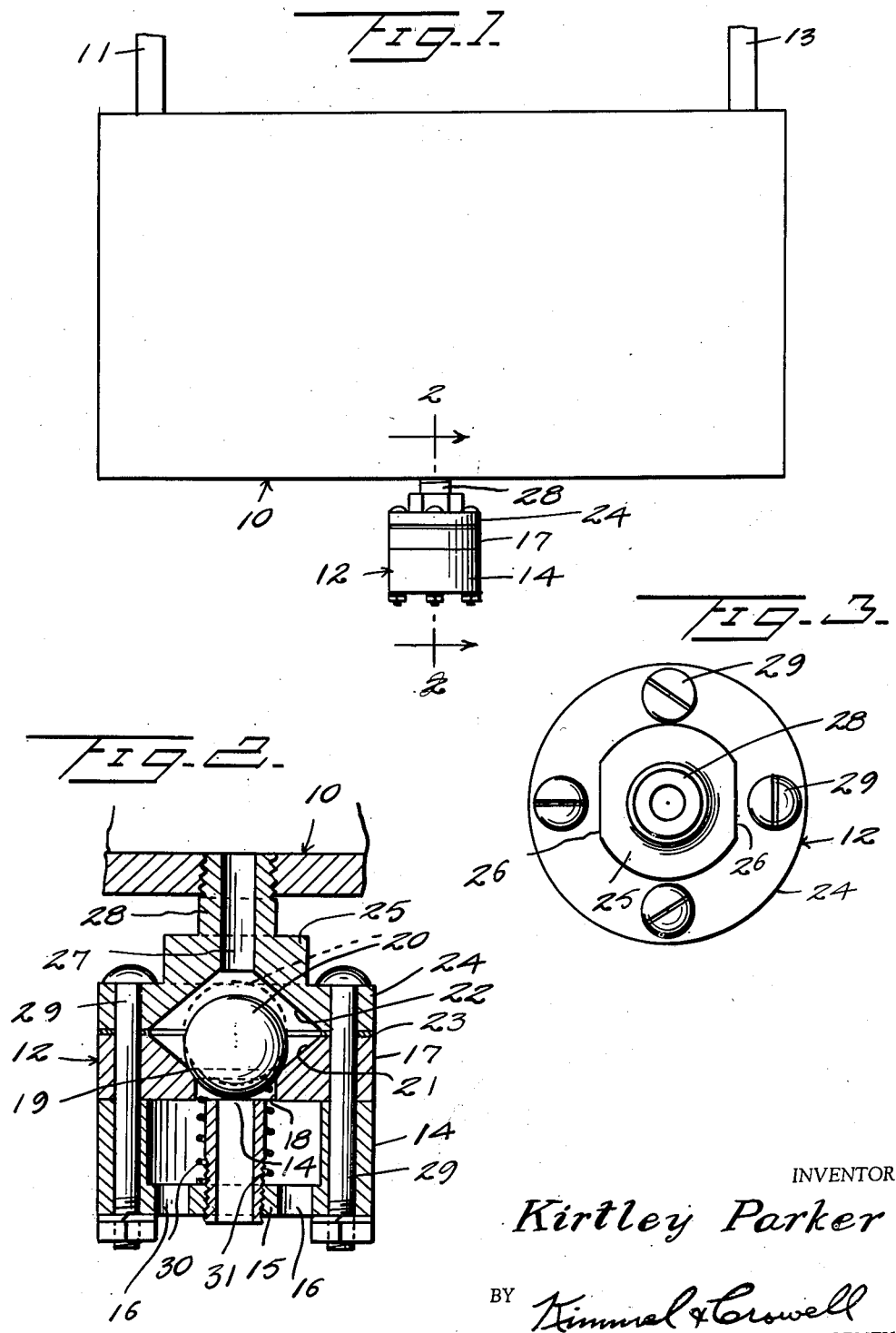
INVENTOR
*Kirtley Parker*
BY *Kimmel & Crowell*
ATTORNEYS Patented Feb. 12, 1952

2,585,675

UNITED STATES PATENT OFFICE 2,585,675

DRAIN VALVE

Kirtley Parker, Panama City, Fla.

Application May 18, 1950, Serial No. 162,630

2 Claims. (Cl. 137—34.2)

This invention relates to a drain valve for fluid pressure systems.

In fluid pressure systems, particularly where air is used as the fluid, a main pressure tank is provided, and it is usual for fluids such as water or oil, to collect in the main tank. In air brake systems such as are used on buses, trucks or the like, it is the practice to open the manual drain valves each night or at stated periods so as to drain any condensate which has collected in the main tank. It is an object of this invention to provide a drain valve which is automatic in its operation and is active to drain any liquids from a tank after the pressure in the tank has been reduced to a predetermined degree. The valve herein disclosed is spring biased to an open position and is moved to a closed position by pressure from the tank. A valve constructed according to this invention can be easily and quickly applied and will not require any attention to effect operation thereof.

The drain valve herein disclosed may also be used in other pressure systems such as air separators, paint spray guns and Diesel engines.

With the above and other objects in view, my invention consists in the arrangement, combination and details of construction disclosed in the drawings and specification, and then more particularly pointed out in the appended claims.

In the drawing:

Figure 1 is a detailed side elevation of a pressure tank interposed in a fluid pressure system such as an air brake system having an automatic drain valve constructed according to an embodiment of this invention secured thereto.

Figure 2 is a sectional view taken on the line 2—2 of Figure 1.

Figure 3 is a plan view of the drain valve.

Referring to the drawing, the numeral 10 designates generally a pressure tank interposed in an air pressure system such as an air brake system having an inlet 11 and an outlet 13. In order to provide a means whereby the liquids accumulating by condensation or the like in the tank 10 may be automatically drained, I have provided a drain valve which includes a housing generally designated as 12. The housing 12 is formed of a lower cylindrical body 14 having a bottom wall 15 which is formed with one or more drain openings 16.

An inner body 17 engages on the upper side of the lower member 14 and is provided with a central opening 18 and with a tapered or beveled valve seat 19. A ball valve 20 is adapted when in closed position to engage on the seat 19 and to be held on the seat 19 by pressure communicated to the housing 12 from the tank. The intermediate body 17 is provided with a flared central portion 21 which forms with a complementary flared surface 22 a drain chamber 23. The flared surface 22 is formed on the lower side of a head 24 which has extending from the upper side thereof a boss 25 formed with at least a pair of flat surfaces 26 for engagement by a wrench. The boss 25 is formed with a central opening 27 and a threaded nipple 28 extends upwardly from the boss 25 and is adapted to be threaded into the lower portion of the tank 10.

The several parts 14, 17, and 24 which form the housing 12 are secured together by means of bolts 29. The ball valve 20 is constantly urged upwardly to a released and draining position by means of a spring 30 which engages about a tubular guide 31 threaded into the bottom wall 15 and projecting upwardly into the interior of the cylindrical wall 14. The spring 30 is of a tension such that when substantial air pressure is discharged into the tank 10 this pressure will force valve member 20 downwardly onto the seat 19 so as to thereby close the outlet port 18. When air pressure in the tank or reservoir 10 has been reduced to a very substantial degree, spring 30 will raise valve 20 to a released position as shown in dotted lines in Figure 2 so that any liquids such as oil or condensate in the bottom of the tank 10 will freely flow through the valve housing 12 and through the drain ports 16 with a portion of the liquids also passing through the spring guide member 31.

In the use and operation of this drain valve, where this valve is used in place of the manually operated drain valves, such manual valves are removed and the nipple 23 threaded into the drain opening of the tank 10. Where the drain 12 is connected to an air brake system such as on a bus or a truck and the air pressure in the brake system is relieved at the end of a run or the like, when the air pressure in tank 10 is reduced to a predetermined degree, spring 30 will raise valve 20 upwardly to an open position so that any liquids in the bottom of tank 10 can freely drain out through the valve structure.

What is claimed is:

1. A drain valve comprising a valve housing formed of a cylindrical side wall, a bottom wall integral with said side wall and formed with at least one drain opening, an intermediate wall engaging the upper end of said side wall, said intermediate wall having a central port and a flared depression at the upper end of said port, a valve seat formed about said port, a top wall engaging against said intermediate wall, said top wall having an upwardly offset recess confronting said depression and forming with the latter a valve chamber, bolts extending through said side, intermediate, and top walls detachably securing said walls together, a ball valve in said chamber engageable on said seat, a nipple extending upwardly from said top wall and communicating with said chamber, and a spring bearing at one end against said bottom wall and at the other end against said ball valve for normally holding said valve in open position.

2. A drain valve comprising a valve housing formed of a cylindrical side wall, a bottom wall integral with said side wall and formed with at least one drain opening, an intermediate wall engaging the upper end of said side wall, said intermediate wall having a central port and a flared depression at the upper end of said port, a valve seat formed about said port, a top wall engaging against said intermediate wall, said top wall having an upwardly offset recess confronting said depression and forming with the latter a valve chamber, means detachably securing said walls together, a ball valve in said chamber engageable on said seat, a nipple extending upwardly from said top wall and communicating with said chamber, a second nipple carried by said bottom wall and extending in the direction of said ball valve, the outer diameter of said second nipple being less than the diameter of said port, the lower end of said second nipple communicating with the atmosphere below said bottom wall, and a spring about said second nipple bearing at one end against said bottom wall and at the other end against said ball valve to normally hold the latter in open position.

KIRTLEY PARKER.

REFERENCES CITED

The following references are of record in the file of this patent:

UNITED STATES PATENTS

| Number | Name | Date |
|---|---|---|
| 701,754 | Moran | June 3, 1902 |
| 1,117,547 | Beulke | Nov. 17, 1914 |
| 1,359,988 | Hensen | Nov. 23, 1920 |
| 1,704,817 | Ayers | Mar. 12, 1929 |
| 1,935,285 | Ayers | Nov. 14, 1933 |
| 2,541,282 | Powers | Feb. 13, 1951 |

FOREIGN PATENTS

| Number | Country | Date |
|---|---|---|
| 14,685 | Great Britain | of 1901 |